(12) United States Patent
Tanimoto

(10) Patent No.: US 10,611,636 B2
(45) Date of Patent: Apr. 7, 2020

(54) METHOD FOR PRODUCING HYDROGEN CHLORIDE

(71) Applicant: SHOWA DENKO K.K., Tokyo (JP)

(72) Inventor: Yosuke Tanimoto, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 74 days.

(21) Appl. No.: 15/745,825

(22) PCT Filed: Jul. 25, 2016

(86) PCT No.: PCT/JP2016/071745
§ 371 (c)(1),
(2) Date: Jan. 18, 2018

(87) PCT Pub. No.: WO2017/026260
PCT Pub. Date: Feb. 16, 2017

(65) Prior Publication Data
US 2018/0208465 A1    Jul. 26, 2018

(30) Foreign Application Priority Data
Aug. 10, 2015    (JP) .................................. 2015-158342

(51) Int. Cl.
*C01B 7/07* (2006.01)
*B01D 3/36* (2006.01)

(52) U.S. Cl.
CPC .............. *C01B 7/0712* (2013.01); *B01D 3/36* (2013.01); *C01B 7/07* (2013.01); *C01P 2006/80* (2013.01)

(58) Field of Classification Search
CPC ........... B01D 3/36; C01B 7/07; C01B 7/0712; C01P 2006/80
See application file for complete search history.

(56) References Cited

U.S. PATENT DOCUMENTS

| 4,349,525 A * | 9/1982 | Yamashita ............ C01B 7/0706 423/482 |
| 6,063,356 A | 5/2000 | Hoffman et al. |

(Continued)

FOREIGN PATENT DOCUMENTS

| JP | 58-009804 A | 1/1983 |
| JP | 06-345410 A | 12/1994 |

(Continued)

OTHER PUBLICATIONS

International Search Report of PCT/JP2016/071745 dated Aug. 30, 2016 [PCT/ISA/210].

(Continued)

*Primary Examiner* — Ngoc-Yen Nguyen
(74) *Attorney, Agent, or Firm* — Sughrue Mion, PLLC

(57) ABSTRACT

Provided is a method for producing a hydrogen chloride that is capable of efficiently producing a hydrogen chloride with a simple facility. The hydrogen chloride is produced by a method including causing an inert gas to be in gas-liquid contact with a hydrochloric acid in which a concentration is 20 mass % to 50 mass %, distilling the hydrochloric acid with which the inert gas is in gas-liquid contact in the gas-liquid contact and separating a hydrogen chloride from the hydrochloric acid to obtain a crude hydrogen chloride, dehydrating the crude hydrogen chloride obtained in the separating, and compressing and liquefying the dehydrated crude hydrogen chloride obtained in the dehydrating, and purifying the liquid crude hydrogen chloride by distillation.

2 Claims, 2 Drawing Sheets

(56) References Cited

U.S. PATENT DOCUMENTS

2007/0261437 A1 11/2007 Boonstra et al.
2013/0259796 A1* 10/2013 Lee .................. C01B 7/012
423/487

FOREIGN PATENT DOCUMENTS

| JP | 09-169502 A | 6/1997 |
| --- | --- | --- |
| JP | 11-509980 A | 8/1999 |
| JP | 2004-002142 A | 1/2004 |
| JP | 2008-230927 A | 10/2008 |
| JP | 2009-1459 A | 1/2009 |
| JP | 2009-536913 A | 10/2009 |
| JP | 2013-545704 A | 12/2013 |
| KR | 10-1203490 B1 | 11/2012 |

OTHER PUBLICATIONS

International Preliminary Report on Patentability with the translation of Written Opinion dated Feb. 22, 2018 issued by the International Bureau in International application No. PCT/JP2016/071745.

* cited by examiner

METHOD FOR PRODUCING HYDROGEN CHLORIDE

TECHNICAL FIELD

The present invention relates to a method for producing a hydrogen chloride.

BACKGROUND ART

A high purity hydrogen chloride (HCl) which is used as an etching gas, a cleaning gas, or a film forming gas at the time of producing a semiconductor or the like, is produced in which impurities are removed by liquefying and distilling a hydrogen chloride that is obtained, for example, with a use of a synthetic hydrochloric acid as a raw material. In such a producing method, there are problems that the impurities are largely removed by the distillation, but a hydrogen bromide (HBr) and a carbon dioxide ($CO_2$) in the impurities are less likely to be removed by the distillation since boiling points of the hydrogen bromide and the carbon dioxide are close to that of the hydrogen chloride, and a distillation tower of a large size becomes necessary.

PTL 1 discloses a technology of passing a hydrogen chloride gas containing a hydrogen bromide through a hydrogen chloride aqueous solution which is saturated with a hydrogen chloride, and obtaining the hydrogen chloride gas in which a content of the hydrogen bromide is reduced. However, in the technology disclosed in PTL 1, there is a problem that it is difficult to reduce the content of the hydrogen bromide up to a level satisfying an impurity concentration that is necessary for a high purity hydrogen chloride gas in the producing of the semiconductor in recent years, for example, approximately 0.2 ppm by volume.

PLT 2 discloses a technology of producing a high purity hydrogen chloride by reacting chlorine ($Cl_2$) and hydrogen ($H_2$) after respectively purifying the chlorine and the hydrogen in advance. The chlorine is purified by removing a carbon dioxide by distillation. However, in the technology disclosed in PTL 2, there is a need to mount a distillation tower or an adsorption tower in order to purify the chlorine and the hydrogen in advance, thereby, there are problems that a facility for producing the high purity hydrogen chloride becomes complicated, and it is difficult to produce the high purity hydrogen chloride in high efficiency.

CITATION LIST

Patent Literature

PTL 1: Japanese Patent Application Laid-Open No. 2004-2142
PTL 2: PCT Japanese Translation Patent Publication No. 2013-545704

SUMMARY OF INVENTION

Technical Problem

In order to solve the problems of the related art described above, an object of the present invention is to provide a method that is capable of efficiently producing a high purity hydrogen chloride with a simple facility.

Solution to Problem

In order to achieve the above object, an aspect of the present invention is as follows as described in [1] and [2].

[1] A method for producing a hydrogen chloride including causing an inert gas to be in gas-liquid contact with a hydrochloric acid in which a concentration is 20 mass % to 50 mass %, distilling the hydrochloric acid with which the inert gas is in gas-liquid contact in the gas-liquid contact and separating a hydrogen chloride from the hydrochloric acid to obtain a crude hydrogen chloride, dehydrating the crude hydrogen chloride obtained in the separating, and compressing and liquefying the dehydrated crude hydrogen chloride obtained in the dehydrating, and purifying the liquid crude hydrogen chloride by distillation.

[2] The method for producing a hydrogen chloride according to [1], in which in the gas-liquid contact, the inert gas comes in gas-liquid contact with the hydrochloric acid, by causing the inert gas to be in contact with the hydrochloric acid of a flow rate in which a linear velocity is 0.1 m/h to 15 m/h and a space velocity is 0.1/h to 10/h in a counter-current flow manner, and a ratio of a volume flow rate of the inert gas to a volume flow rate of the hydrochloric acid is 0.01 to 100.

Advantageous Effects of Invention

According to the present invention, it is possible to efficiently produce the high purity hydrogen chloride with a simple facility.

DESCRIPTION OF EMBODIMENTS

Figure 1:
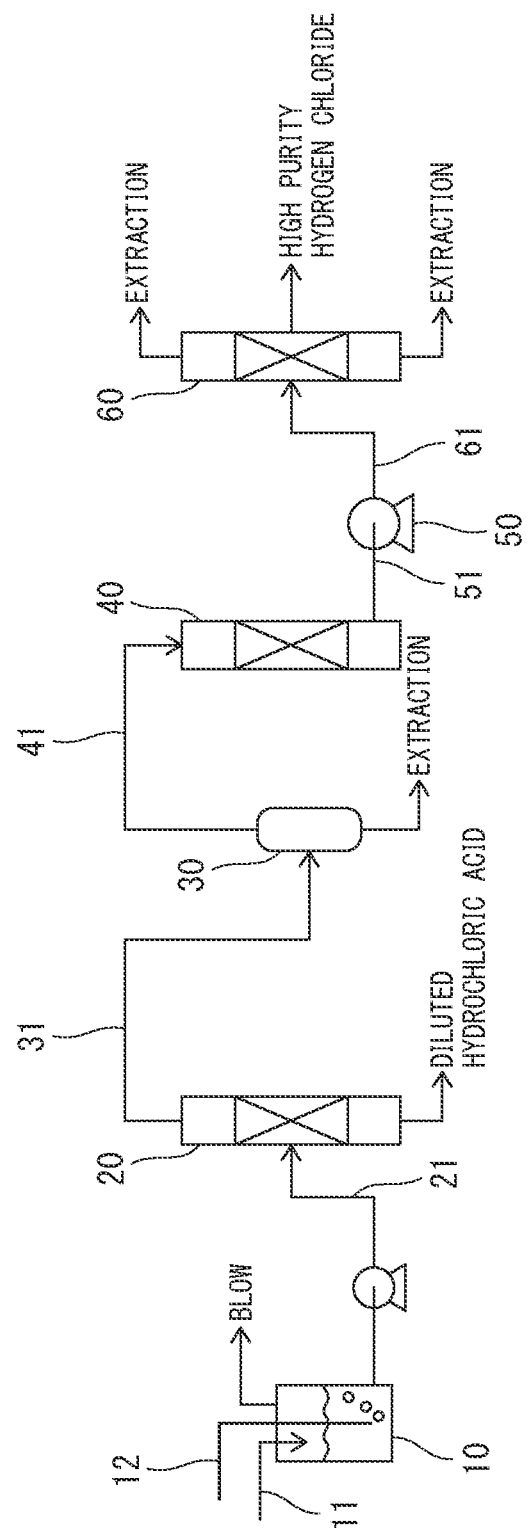
FIG. 1 is a schematic diagram of a facility that produces a high purity hydrogen chloride to describe a method for producing a high purity hydrogen chloride according to Example 1.

The inventors of the present invention diligently studied in order to solve the above problems, and resultantly, found out that an inert gas is in gas-liquid contact with a hydrochloric acid, thereafter, a hydrogen chloride is separated from the hydrochloric acid by distillation, thereby, it is possible to efficiently produce a hydrogen chloride in which a content of impurities (for example, a hydrogen bromide and a carbon dioxide are less likely to be removed by the distillation since boiling points of the hydrogen bromide and the carbon dioxide are close to that of the hydrogen chloride) is low with a simple facility, and the present invention was completed. Hereinafter, an embodiment of the present invention will be described in detail.

A method for producing a hydrogen chloride according to the embodiment includes causing an inert gas to be in gas-liquid contact with a hydrochloric acid in which a concentration of the hydrogen chloride is 20 mass % to 50 mass %, distilling the hydrochloric acid with which the inert gas is in gas-liquid contact in the gas-liquid contact and separating a hydrogen chloride from the hydrochloric acid to obtain a crude hydrogen chloride, dehydrating the crude hydrogen chloride obtained in the separating, and compressing and liquefying the dehydrated crude hydrogen chloride obtained in the dehydrating, and purifying the liquid crude hydrogen chloride by distillation.

The hydrochloric acid which is used as a raw material in the method for producing a high purity hydrogen chloride according to the embodiment, is an aqueous solution in which a concentration of the hydrogen chloride is 20 mass % to 50 mass %. If the concentration of the hydrogen chloride is 20 mass % to 50 mass %, for example, in a case where the hydrochloric acid is distilled in a distillation tower, the gas obtained from a head of the tower is rich in hydrogen chloride. If the concentration of the hydrogen chloride is less than 20 mass %, since the concentration of the hydrogen chloride which is azeotropic composition or more is not included, the gas obtained from the head of the tower is not rich in hydrogen chloride. Since the hydrochloric acid in which the concentration of the hydrogen chloride exceeds 50 mass % exceeds saturated solubility of the hydrogen chloride under conditions of a normal temperature and an atmospheric pressure, the hydrochloric acid in which the concentration of the hydrogen chloride exceeds 50 mass % is not normally used. Under the conditions of the normal temperature and the atmospheric pressure, the hydrochloric acid in which the concentration of the hydrogen chloride is 40 mass % or less is preferable.

In the embodiment, the hydrogen bromide and the carbon dioxide are particularly noticed as impurities in the hydrogen chloride, but a mixture thereof is caused by the hydrochloric acid of a raw material. In a general synthetic hydrochloric acid, the concentration of the hydrogen bromide is normally 1 ppm by mass to 100 ppm by mass, and the concentration of the carbon dioxide is normally 0.01 ppm by mass to 5 ppm by mass. As described above, even if an attempt is made to obtain the high purity hydrogen chloride by distilling the hydrogen chloride obtained from the synthetic hydrochloric acid with a method of the related art, it is difficult to sufficiently remove the hydrogen bromide and the carbon dioxide in which the boiling points are close to that of the hydrogen chloride.

Regarding the carbon dioxide, it is found out that a gas-liquid equilibrium constant (K-value=[$CO_2$] gas phase/[$CO_2$] liquid phase) of the carbon dioxide in the liquefied hydrogen chloride is 1.3 if the gas-liquid equilibrium constant thereof is experimentally obtained, and separation efficiency in the gas-liquid is poor as the value is close to 1. However, if the hydrochloric acid is in a state of being the aqueous solution, it is found out that the carbon dioxide is likely to be removed from the hydrochloric acid, by the gas-liquid contact of the inert gas. Accordingly, if the hydrochloric acid from which the carbon dioxide is removed is used, it is found out that it is possible to produce the high purity hydrogen chloride in which the concentration of the carbon dioxide is low, for example, to be less than 0.4 ppm by volume.

In a gas-liquid contact step of the method for producing a hydrogen chloride according to the embodiment, the inert gas such as nitrogen ($N_2$), argon, or helium is in gas-liquid contact with the hydrochloric acid. A method for causing the inert gas to be in gas-liquid contact with the hydrochloric acid is not particularly limited, but from the viewpoint of efficiency, it is preferable that the method is performed by the contact of a counter-current flow in which the hydrochloric acid is circulated from an upper side to a lower side, and the inert gas is circulated from the lower side to the upper side.

A suitable condition at the time of causing the inert gas to be in gas-liquid contact with the hydrochloric acid is not capable of being sweepingly stated since the suitable condition may vary depending on a structure of a used apparatus, the concentration of the hydrochloric acid, or the like, but the temperature is preferably 0° C. to 60° C., and the pressure is preferably 0.01 MPa to 1 MPa (absolute pressure).

The inventors of the present invention diligently studied regarding the flow rates of the hydrochloric acid and the inert gas when the inert gas was in gas-liquid contact with the hydrochloric acid, and resultantly, found out that it was possible to more effectively remove the carbon dioxide by causing the inert gas to be in gas-liquid contact with the hydrochloric acid under the following conditions. The gas-liquid contact of the hydrochloric acid and the inert gas may be in a continuous manner or a batch manner.

That is, in the flow rate of the hydrochloric acid, it is preferable that a linear velocity is 0.1 m/h to 15 m/h and a space velocity is 0.1/h to 10/h, and a ratio of a volume flow rate of the inert gas to a volume flow rate of the hydrochloric acid is 0.01 to 100. The linear velocity of the hydrochloric acid is preferably 0.1 m/h to 15 m/h, more preferably 1 m/h to 10 m/h, and further preferably 1.5 m/h to 7 m/h. The space velocity of the hydrochloric acid is preferably 0.1/h to 10/h, more preferably 0.1/h to 5/h, and further preferably 0.2/h to 3/h. Furthermore, the ratio of the volume flow rate of the hydrochloric acid to the volume flow rate of the inert gas is preferably 0.01 to 100, more preferably 0.1 to 50, and further preferably 1 to 40.

Regarding the flow rate of the hydrochloric acid, if the linear velocity is 0.1 m/h to 15 m/h and the space velocity is 0.1/h to 10/h, it is possible to sufficiently remove the carbon dioxide from the hydrochloric acid by causing the inert gas to be in gas-liquid contact with the hydrochloric acid, and it is possible to obtain the hydrochloric acid from which the carbon dioxide is removed, in large quantities, accordingly, the values are efficient.

Regarding the flow rate of the inert gas, if the ratio of the volume flow rate of the inert gas to the volume flow rate of the hydrochloric acid is 0.01 to 100, the carbon dioxide is sufficiently removed from the hydrochloric acid by causing the inert gas to be in gas-liquid contact with the hydrochloric acid. In general, it is considered that removal efficiency of the carbon dioxide becomes large as the flow rate is increased, but in actual fact, an influence of the flow rate of the inert gas on the removal efficiency of the carbon dioxide is not large. Accordingly, even if the ratio of the volume flow rate of the inert gas to the volume flow rate of the hydrochloric acid is larger than 100, there is a concern that not only the value does not contribute so much to improvement of the removal efficiency of the carbon dioxide, but also a loss of the hydrochloric acid occurs by being accompanied with a hydrochloric acid spray. In case of the batch manner, the ratio of the volume flow of the inert gas to the volume flow of the hydrochloric acid is preferably 0.1 to 100, and at that time, the gas-liquid contact time is preferably 3 minutes to 300 minutes.

Next, regarding the hydrogen bromide, it is found out that the gas-liquid equilibrium constant (K-value=[HBr] gas phase/[HBr] liquid phase) of the hydrogen bromide in the liquefied hydrogen chloride is 0.8 if the gas-liquid equilibrium constant thereof is experimentally obtained, and the separation efficiency in the gas-liquid is poor as the value is close to 1. However, the concentration of the hydrogen bromide of the hydrogen chloride in which the hydrochloric acid in which the concentration is 35 mass % is heated and evaporated, and the concentration of the hydrogen bromide in the residual liquid are measured, and the gas-liquid equilibrium constant of the hydrogen bromide in the hydrochloric acid is obtained, and resultantly, it is clear that the value is 0.2, and is different from behavior of the hydrogen bromide in liquefied hydrogen chloride.

That is, it is found that it is difficult to sufficiently separate the hydrogen bromide in the distillation of the hydrogen chloride, but it is possible to easily separate the hydrogen bromide in the distillation of the hydrochloric acid. Therefore, in the embodiment, the crude hydrogen chloride is obtained by distilling the hydrochloric acid, without obtaining the crude hydrogen chloride by diffusing the hydrogen chloride from the hydrochloric acid due to heating, introduction of the inert gas, or the like. In other words, in the method for producing a hydrogen chloride according to the embodiment, the crude hydrogen chloride in which the hydrogen chloride is separated from the hydrochloric acid by distilling the hydrochloric acid with which the inert gas is in gas-liquid contact in the gas-liquid contact step, is obtained in in a separation step.

The distillation of the hydrochloric acid which is the raw material may be performed in the continuous manner or the batch manner, but it is preferable that the distillation is performed in a continuous manner. A method for introducing the hydrochloric acid into the distillation tower is appropriately selected depending on whether the distillation of the hydrochloric acid is performed in the batch manner or the continuous manner. In case of the continuous manner, the introduction of the hydrochloric acid into the distillation tower is continuously performed. Considering the separation efficiency of the hydrogen bromide by the distillation and distilling-out prevention efficiency of the hydrochloric acid in which the concentration is diluted by distilling out the hydrogen chloride with respect to the head of the tower, it is preferable that an introduction position of the hydrochloric acid in the distillation tower is in the vicinity of a center portion in a height direction of the distillation tower.

By the distillation of the hydrochloric acid, the crude hydrogen chloride in which the concentration of the hydrogen bromide is low is obtained from the head of the distillation tower, but the hydrochloric acid which includes a large quantity of the hydrogen bromide, and in which the concentration is diluted by distilling out the hydrogen chloride is distilled out from a bottom of the distillation tower. A distribution ratio of the hydrogen bromide is determined in accordance with the value (for example, 0.2) of the gas-liquid equilibrium constant and the number of stages of the distillation tower. The concentration of the hydrochloric acid which is distilled out from the bottom of the distillation tower is not particularly limited, but the value is preferably an azeotropic concentration under the pressure of distillation conditions, and the value is 20 mass % in case of the atmospheric pressure.

An operating pressure in the distillation of the hydrochloric acid of the separation step, is made such that the azeotropic concentration of the hydrogen chloride under the operating pressure is lower than the concentration of the hydrogen chloride of the hydrochloric acid which is provided in the distillation. The value of the operating pressure satisfying such a condition is determined from a relationship between the concentration of the hydrogen chloride of the hydrochloric acid, the azeotropic concentration of the hydrogen chloride, and the pressure. If the distillation is performed at the operating pressure which is made such that the azeotropic concentration of the hydrogen chloride under the operating pressure is equal to or higher than the concentration of the hydrogen chloride of the hydrochloric acid as a raw material, moisture and the hydrogen bromide accompanied therewith are largely mixed to a fraction obtained from the head of the tower. On the other hand, if the distillation is performed at the operating pressure which is made such that the azeotropic concentration of the hydrogen chloride under the operating pressure is lower than the concentration of the hydrogen chloride of the hydrochloric acid as a raw material, it is possible to prevent the distilling-out of the moisture from the head of the tower, and the crude hydrogen chloride in which the concentration of the hydrogen bromide is low is obtained.

It is preferable that the operating pressure of the distillation of the hydrochloric acid is selected from a range which is 0.1 MPa to 0.5 MPa (absolute pressure). As long as the distillation of the hydrochloric acid is performed at such an operating pressure, it is possible to obtain the crude hydrogen chloride of the sufficient quantity, without increasing the load on a distillation facility. The distillation under the reduced pressure condition is not preferable since the concentration of the hydrogen chloride of the azeotropic composition becomes high, and the obtained quantity of the hydrogen chloride is reduced.

An operating temperature (the temperature at the bottom of the distillation tower) of the distillation of the hydrochloric acid depends on the operating pressure or the like, but the temperature is normally 100° C. to 150° C.

A form of the distillation tower is not particularly limited, and it is possible to use the distillation tower such as a packed tower or a tray tower which is generally used, but the packed tower is preferable since a structure thereof is simple. As a packing material with which the packed tower is packed, for example, it is possible to use the existing material such as Raschig ring, Pall ring, or Tellerette (registered trademark).

Next, in a dehydration step of the method for producing a hydrogen chloride according to the embodiment, the crude hydrogen chloride obtained in the separation step is dehydrated, but the dehydrating method is not particularly limited. For example, a method in which moisture is removed from the crude hydrogen chloride due to an adsorption action of a carrier, by causing the carrier to be in contact with the crude hydrogen chloride in an absorber which is packed with the carrier such as activated alumina or zeolite, or a method in which the moisture is condensed by cooling the crude hydrogen chloride may be used. Alternatively, the method of using the carrier and the method of condensing the moisture may be used in combination.

Next, in a purification step of the method for producing a hydrogen chloride according to the embodiment, the high purity hydrogen chloride is obtained by compressing and liquefying the dehydrated crude hydrogen chloride obtained in the dehydration step, for example, at the pressure of 2.6 MPa (absolute pressure) or more in case of approximately 0° C., and purifying the liquid crude hydrogen chloride by distillation. A distillation apparatus which can be used in the purification step may be any as long as the apparatus has a function which is necessary for the normal distillation, but it is preferable to use a rectification apparatus (distillation tower) such as the tray tower or the packed tower. However, the packed tower is more preferable since the structure thereof is simple. As a packing material with which the packed tower is packed, for example, it is possible to use the existing material such as Raschig ring, Pall ring, or Tellerette (registered trademark). It is possible to perform the distillation in a continuous manner (continuous distillation) or a batch manner (batch distillation).

An operating condition of the distillation of the hydrogen chloride may include various aspects depending on a utility, the needed quality of the hydrogen chloride, or the like, and is not particularly limited. However, considering that a head temperature of the distillation tower does not become too low, it is possible to set the operating pressure to be 0.1 MPa to 10 MPa, and the operating pressure is preferably 0.5 MPa to 5 MPa. In case of such an operating condition, the head temperature of the distillation tower is within a range which is −80° C. to 60° C. The distillation is performed under the conditions described above, a component in which the boiling point is low is extracted from the head of the tower, and a component in which the boiling point is high is extracted from the bottom, thereby, it is possible to obtain the high purity hydrogen chloride from a middle stage of the distillation tower.

By such a method for producing a hydrogen chloride according to the embodiment, for example, it is possible to efficiently produce the high purity hydrogen chloride in which a purity is 99.999 mass % or more with the simple facility. For example, it is possible to use the produced high purity hydrogen chloride as an etching gas or a cleaning gas at the time of producing a semiconductor or a thin film transistor. Particularly, in an epitaxial growth process of Si—Ge (semiconductor), GaN (light-emitting diode or the like), and SiC (power semiconductor), the produced high purity hydrogen chloride is used not only as a cleaning gas but also as a film forming gas. However, since the impurities remain in the film if the impurities are present in the film forming gas, the high purity hydrogen chloride obtained by the method for producing a hydrogen chloride according to the embodiment is very useful. It is possible to use the high purity hydrogen chloride in the producing of various chemical agents such as a medicine and a dye intermediate.

The embodiment illustrates one example of the present invention, and the present invention is not limited thereto. Various modifications or improvements may be added to the embodiment, and the embodiment to which such a modification or improvement is added may be included in the present invention.

EXAMPLES

Hereinafter, the present invention will be described in more detail with reference to Examples.

Example 1

A high purity hydrogen chloride was produced by using a production facility illustrated in FIG. 1. As a hydrochloric acid of the raw material, a material containing the hydrogen chloride in which the concentration is 35 mass %, the hydrogen bromide of 70 ppm by mass as an impurity, and the carbon dioxide of 2 ppm by mass was used.

The hydrochloric acid was introduced into a cushion tank 10 having a capacity of 1000 kg at the flow rate of 580 kg/h through a hydrochloric acid introduction pipe 11. With respect to the hydrochloric acid within the cushion tank 10, nitrogen was introduced at the flow rate of 600 NL/h through an inert gas introduction pipe 12, and was bubbled under the atmosphere of a room temperature (gas-liquid contact step).

The bubbling of the nitrogen was carried on while the hydrochloric acid was continuously introduced into the cushion tank 10 at the flow rate of 580 kg/h, and the hydrochloric acid was continuously extracted from the cushion tank 10 at the flow rate of 580 kg/h, thereby, the hydrochloric acid was liquid-sent to a distillation tower 20 through a hydrochloric acid liquid-sending pipe 21. At this time, the ratio of the volume flow rate of the inert gas to the volume flow rate of the hydrochloric acid was 1.3.

The hydrochloric acid with which the inert gas was in gas-liquid contact was distilled under the conditions of the pressure of 0.1 MPaG and the temperature of 115° C. in the distillation tower 20, and the hydrogen chloride was separated from the hydrochloric acid (separation step). From the head of the distillation tower 20, the crude hydrogen chloride was extracted at the flow rate of 93 kg/h, and from the bottom of the distillation tower 20, the hydrochloric acid in which the concentration was diluted by distilling out the hydrogen chloride was extracted at the flow rate of 487 kg/h.

The concentration of the hydrogen chloride of the crude hydrogen chloride extracted from the head of the tower was 96 volume %, the concentration of the hydrogen bromide as an impurity was 0.2 ppm by volume, and the concentration of the carbon dioxide was 10 ppm by volume. The concentration of the hydrogen chloride of the hydrochloric acid extracted from the bottom thereof was 23 mass %, the concentration of the hydrogen bromide as an impurity was 83 ppm by mass, and the concentration of the carbon dioxide was 1 ppm by mass.

Since the crude hydrogen chloride extracted from the head of the distillation tower 20 contained the moisture, the crude hydrogen chloride was sent to a condenser 30 and a moisture adsorption tower 40, thereby, the dehydration was performed (dehydration step). That is, the crude hydrogen chloride was sent to the condenser 30 from the distillation tower 20 through a hydrogen chloride plumbing 31, and was cooled at −5° C., thereby, the moisture in the crude hydrogen chloride was condensed, and a portion of the moisture of the crude hydrogen chloride was removed.

The crude hydrogen chloride was sent to the moisture adsorption tower 40 from the condenser 30 through a hydrogen chloride plumbing 41, and was dehydrated by being circulated into an adsorbing agent (Molecular Sieve 3A manufactured by Union Showa K. K.) with which the moisture adsorption tower 40 was packed. Thereby, the dehydrated crude hydrogen chloride was obtained at the flow rate of 90 kg/h. The concentration of the hydrogen chloride of the dehydrated crude hydrogen chloride was 99.9 volume %, and the carbon dioxide of 13 ppm by volume was contained as an impurity.

The dehydrated crude hydrogen chloride was sent to a compressor 50 from the moisture adsorption tower 40 through a hydrogen chloride plumbing 51, and was condensed (liquefied) by being pressurized at 2.6 MPa (absolute pressure) or more and being compressed with the compressor 50. The liquefied crude hydrogen chloride was sent to a distillation tower 60 from the compressor 50 through a hydrogen chloride plumbing 61, and the component of the low boiling point and the component of the high boiling point were respectively removed by the distillation, thereby, the high purity hydrogen chloride was extracted from the middle stage of the distillation tower (purification step).

If described in detail, first, in order to remove a heavy metal component contained as a very small quantity, the component of the high boiling point was extracted from the bottom at the flow rate of 9.0 kg/h. Thereafter, the component of the low boiling point in which the carbon dioxide of 520 ppm by volume was contained and the hydrogen chloride of the concentration of 99 volume % was included, was extracted from the head of the tower at the flow rate of 1.8 kg/h.

Thereby, the high purity hydrogen chloride in which the purity was 99.999 mass % or more was obtained from the middle stage of the distillation tower 60 at the flow rate of 79 kg/h. The concentrations of the impurities which were contained in the obtained high purity hydrogen chloride were measured, and resultantly, the hydrogen bromide was 0.2 ppm by volume, and the carbon dioxide was 1.8 ppm by volume.

Example 2

Figure 2:
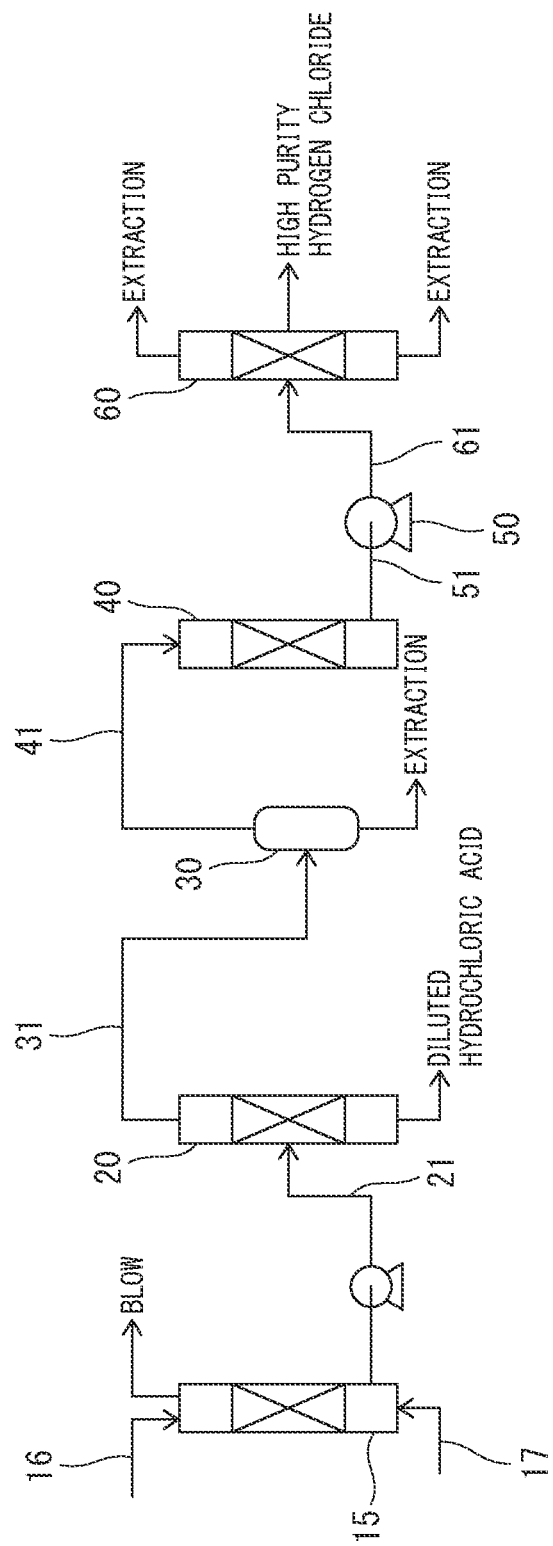
FIG. 2 is a schematic diagram of a facility that produces a high purity hydrogen chloride to describe a method for producing a high purity hydrogen chloride according to Example 2.

The high purity hydrogen chloride was produced by using the production facility illustrated in FIG. 2. The method for producing the high purity hydrogen chloride according to Example 2 is substantially the same as the method for producing the high purity hydrogen chloride according to Example 1, except for the gas-liquid contact step. The hydrochloric acid which is used as a raw material is the same as that of Example 1. In FIG. 2, a reference sign which is the same as that of FIG. 1 is assigned to the same portion or an equivalent portion.

The hydrochloric acid as a raw material was introduced into a carbon dioxide diffusion tower 15 through a hydrochloric acid introduction pipe 16, and was in contact with the nitrogen which was introduced through a nitrogen introduction pipe 17 in a counter-current flow manner (gas-liquid contact step). The carbon dioxide diffusion tower 15 has a diameter of 500 mm and a tower height of 6 m in size, and includes a packed bed which is packed with the packing materials.

In the carbon dioxide diffusion tower 15, the hydrochloric acid was circulated to the lower side from the upper side, and the nitrogen was circulated to the upper side from the lower side, thereby, both were in contact with each other in the counter-current flow manner. The flow rate of the hydrochloric acid was set to be 382 kg/h (the volume flow rate of 324 NL/h, a linear velocity LV=1.7 m/h, and a space velocity SV=0.28/h), and the flow rate of the nitrogen was set to be 13.4 kg/h (the volume flow rate of 10.7 $Nm^3$/h). Accordingly, the ratio of the volume flow rate of the inert gas to the volume flow rate of the hydrochloric acid is 33.

From the upper side of the carbon dioxide diffusion tower 15, the nitrogen accompanied with the hydrochloric acid of 4 kg/h as a loss was extracted, and from the lower side thereof, the hydrochloric acid was extracted at the flow rate of 378 kg/h. The concentration of the hydrogen chloride of the extracted hydrochloric acid was 35 mass %, the concentration of the hydrogen bromide as an impurity was 70 ppm by mass, and the concentration of the carbon dioxide was 0.05 ppm by mass.

In the carbon dioxide diffusion tower 15, the hydrochloric acid with which the inert gas was in gas-liquid contact is liquid-sent to the distillation tower 20 through the hydrochloric acid liquid-sending pipe 21, and was distilled under the conditions of the atmospheric pressure and the temperature of 110° C. in the distillation tower 20, thereby, the hydrogen chloride was separated from the hydrochloric acid (separation step).

From the head of the distillation tower 20, the crude hydrogen chloride was extracted at the flow rate of 61 kg/h, and from the bottom of the distillation tower 20, the hydrochloric acid in which the concentration was diluted by distilling out the hydrogen chloride was extracted at the flow rate of 317 kg/h.

The concentration of the hydrogen chloride of the crude hydrogen chloride extracted from the head of the distillation tower 20 was 96 volume %, the concentration of the hydrogen bromide as an impurity was 0.2 ppm by volume, and the concentration of the carbon dioxide was 0.4 ppm by volume. The concentration of the hydrogen chloride of the hydrochloric acid extracted from the bottom thereof was 23 mass %, the concentration of the hydrogen bromide as an impurity was 83 ppm by mass, and the concentration of the carbon dioxide was 1 ppm by mass.

Since the crude hydrogen chloride extracted from the head of the distillation tower 20 contained the moisture, the crude hydrogen chloride was sent to the condenser 30 and the moisture adsorption tower 40 in the same manner as Example 1, thereby, the dehydration was performed (dehydration step). Accordingly, the dehydrated crude hydrogen chloride was obtained at the flow rate of 59 kg/h. The concentration of the hydrogen chloride of the dehydrated crude hydrogen chloride was 99.9 volume %.

The dehydrated crude hydrogen chloride was sent to the compressor 50 from the moisture adsorption tower 40 through the hydrogen chloride plumbing 51, and was condensed (liquefied) by being pressurized at 2.6 MPa (absolute pressure) or more and being compressed with the compressor 50. The liquefied crude hydrogen chloride was sent to the distillation tower 60 from the compressor 50 through the hydrogen chloride plumbing 61, and the component of the low boiling point and the component of the high boiling point were respectively removed by the distillation, thereby, the high purity hydrogen chloride was extracted from the middle stage of the distillation tower (purification step).

If described in detail, first, in order to remove the heavy metal component contained as a very small quantity, the component of the high boiling point was extracted from the bottom at the flow rate of 6 kg/h. Thereafter, the component of the low boiling point in which the carbon dioxide of 10 ppm by volume was contained and the hydrogen chloride of the concentration of 99 volume % was included, was extracted from the head of the tower at the flow rate of 0.4 kg/h.

Thereby, the high purity hydrogen chloride in which the purity was 99.999 mass % or more was obtained from the middle stage of the distillation tower 60 at the flow rate of 52.6 kg/h. The concentrations of the impurities which were contained in the obtained high purity hydrogen chloride were measured, and resultantly, the hydrogen bromide was 0.2 ppm by volume, and the carbon dioxide was 0.4 ppm by volume.

Example 3

The high purity hydrogen chloride was produced in the same manner as Example 2, except for a point that the size of the carbon dioxide diffusion tower 15 was changed to be 500 mm in diameter, and 1 m in tower height. Since the size of the carbon dioxide diffusion tower 15 is different, the space velocity SV of the flow rate of the hydrochloric acid in the gas-liquid contact step becomes 1.7/h.

As a result, the high purity hydrogen chloride in which the purity was 99.999 mass % or more was obtained from the distillation tower 60 at the flow rate of 52.6 kg/h. The concentrations of the impurities which were contained in the obtained high purity hydrogen chloride were measured, and resultantly, the hydrogen bromide was 0.2 ppm by volume, and the carbon dioxide was 1.1 ppm by volume.

Example 4

The high purity hydrogen chloride was produced in the same manner as Example 2, except for a point that the size of the carbon dioxide diffusion tower 15 was changed to be 250 mm in diameter, and 6 m in tower height. Since the size of the carbon dioxide diffusion tower 15 is different, the linear velocity LV of the flow rate of the hydrochloric acid in the gas-liquid contact step becomes 6.6 m/h, and the space velocity SV becomes 1.1/h.

As a result, the high purity hydrogen chloride in which the purity was 99.999 mass % or more was obtained from the distillation tower 60 at the flow rate of 52.6 kg/h. The concentrations of the impurities which were contained in the obtained high purity hydrogen chloride were measured, and resultantly, the hydrogen bromide was 0.2 ppm by volume, and the carbon dioxide was 1.5 ppm by volume.

Comparative Example 1

The hydrogen chloride was produced in the same manner as Example 1, except for a point that the content of the separation step was changed as follows. That is, in the separation step of Example 1, the crude hydrogen chloride was obtained by distilling the hydrochloric acid and separating the hydrogen chloride from the hydrochloric acid. However, in the separation step of Comparative Example 1, the hydrochloric acid was simply heated by using a hydrochloric acid diffusion tower in replacement of the distillation tower 20, thereby, the crude hydrogen chloride in which the hydrogen chloride was diffused from the hydrochloric acid was obtained. As a hydrochloric acid diffusion tower, the tower having the packed bed which was packed with the packing materials was used. Diffusion conditions were set to be the temperature of 110° C. at the bottom of the tower, and the atmospheric pressure.

As a result, the hydrogen chloride in which the purity was 99.998 mass % or more was obtained from the distillation tower 60 at the flow rate of 79 kg/h. The concentrations of the impurities which were contained in the obtained hydrogen chloride were measured, and resultantly, the hydrogen bromide was 4 ppm by volume, and the carbon dioxide was 1.8 ppm by volume.

Comparative Example 2

The hydrogen chloride was produced in the same manner as Example 1, except for a point that the distillation was performed by introducing the hydrochloric acid as a raw material directly into the distillation tower 20, without performing the gas-liquid contact step.

As a result, the hydrogen chloride in which the purity was 99.998 mass % or more was obtained from the distillation tower 60 at the flow rate of 79 kg/h. The concentrations of the impurities which were contained in the obtained hydrogen chloride were measured, and resultantly, the hydrogen bromide was 0.2 ppm by volume, and the carbon dioxide was 10 ppm by volume.

REFERENCE SIGNS LIST

10 cushion tank
15 carbon dioxide diffusion tower
20 distillation tower
30 condenser
40 moisture adsorption tower
50 compressor
60 distillation tower

The invention claimed is:

1. A method for producing a hydrogen chloride comprising:
    causing an inert gas to be in gas-liquid contact with a hydrochloric acid in which a concentration of hydrogen chloride is 20 mass % to 50 mass % to obtain a hydrochloric acid that has been contacted with inert gas;
    distilling the hydrochloric acid that has been contacted with inert gas and separating a hydrogen chloride from the hydrochloric acid to obtain a crude hydrogen chloride;
    dehydrating the crude hydrogen chloride to obtain a dehydrated crude hydrogen chloride;
    compressing and liquefying the dehydrated crude hydrogen chloride to obtain a liquid crude hydrogen chloride; and
    purifying the liquid crude hydrogen chloride by distillation.

2. The method for producing a hydrogen chloride according to claim 1, wherein in the gas-liquid contact, the inert gas comes in gas-liquid contact with the hydrochloric acid, by causing the inert gas to be in contact with the hydrochloric acid of a flow rate in which a linear velocity is 0.1 m/h to 15 m/h and a space velocity is 0.1/h to 10/h in a counter-current flow manner, and a ratio of a volume flow rate of the inert gas to a volume flow rate of the hydrochloric acid is 0.01 to 100.

* * * * *